United States Patent [19]

Amoroso, Jr.

[11] 3,761,927
[45] Sept. 25, 1973

[54] RF PHASE DETECTED INTERFEROMETER RADAR

[75] Inventor: Salvatore Amoroso, Jr., Fairfield, Conn.

[73] Assignee: United Aircraft Corporation, East Hartford, Conn.

[22] Filed: Mar. 20, 1972

[21] Appl. No.: 236,046

[52] U.S. Cl. ............................ 343/16 R, 343/113 R
[51] Int. Cl. ............................ G01s 3/46, G01s 9/02
[58] Field of Search ............ 343/16 R, 16 M, 113 R

[56] References Cited
UNITED STATES PATENTS

| 3,089,136 | 5/1963 | Albersheim | 343/16 R |
| 3,212,089 | 10/1965 | Longacre et al. | 343/16 M |
| 3,396,395 | 8/1968 | Ball et al. | 343/113 R |
| 3,680,102 | 7/1972 | Poinsard | 343/16 M |

*Primary Examiner*—Malcolm F. Hubler
*Attorney*—Melvin Pearson Williams

[57] ABSTRACT

Two elements of a duplex interferometer antenna each feed respective ports of a cross coupling network, the output of which is applied to a quadrature hybrid used as an RF phase detector. The phase detector outputs are alternately sampled on a PRF basis, heterodyned to an intermediate frequency and processed through a signal logarithmic IF amplifier which is also sampled on an alternate basis, one of the alternate outputs being subtracted from the other to achieve a ratio.

2 Claims, 5 Drawing Figures

Patented Sept. 25, 1973
3,761,927
3 Sheets-Sheet 1
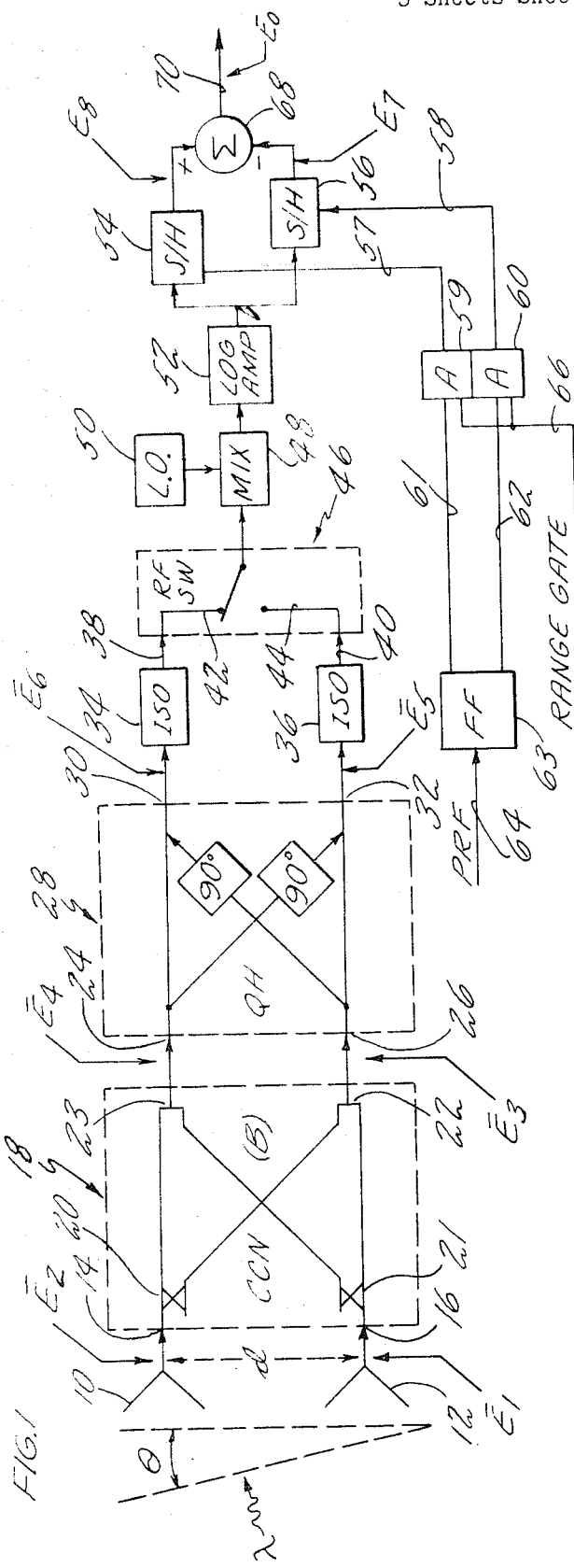
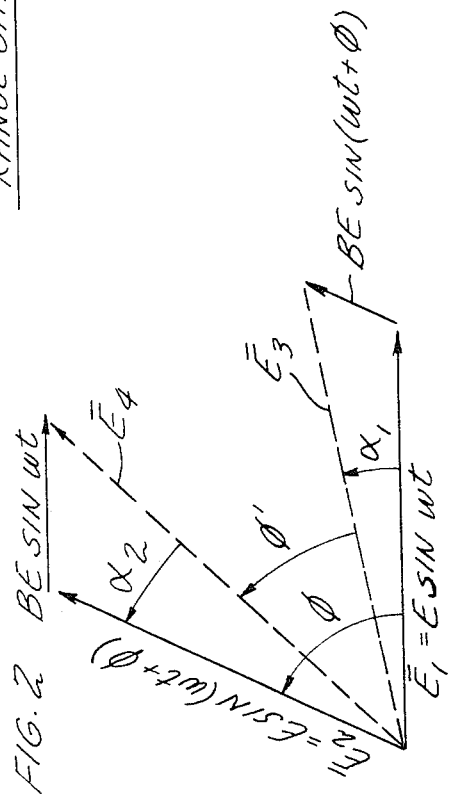

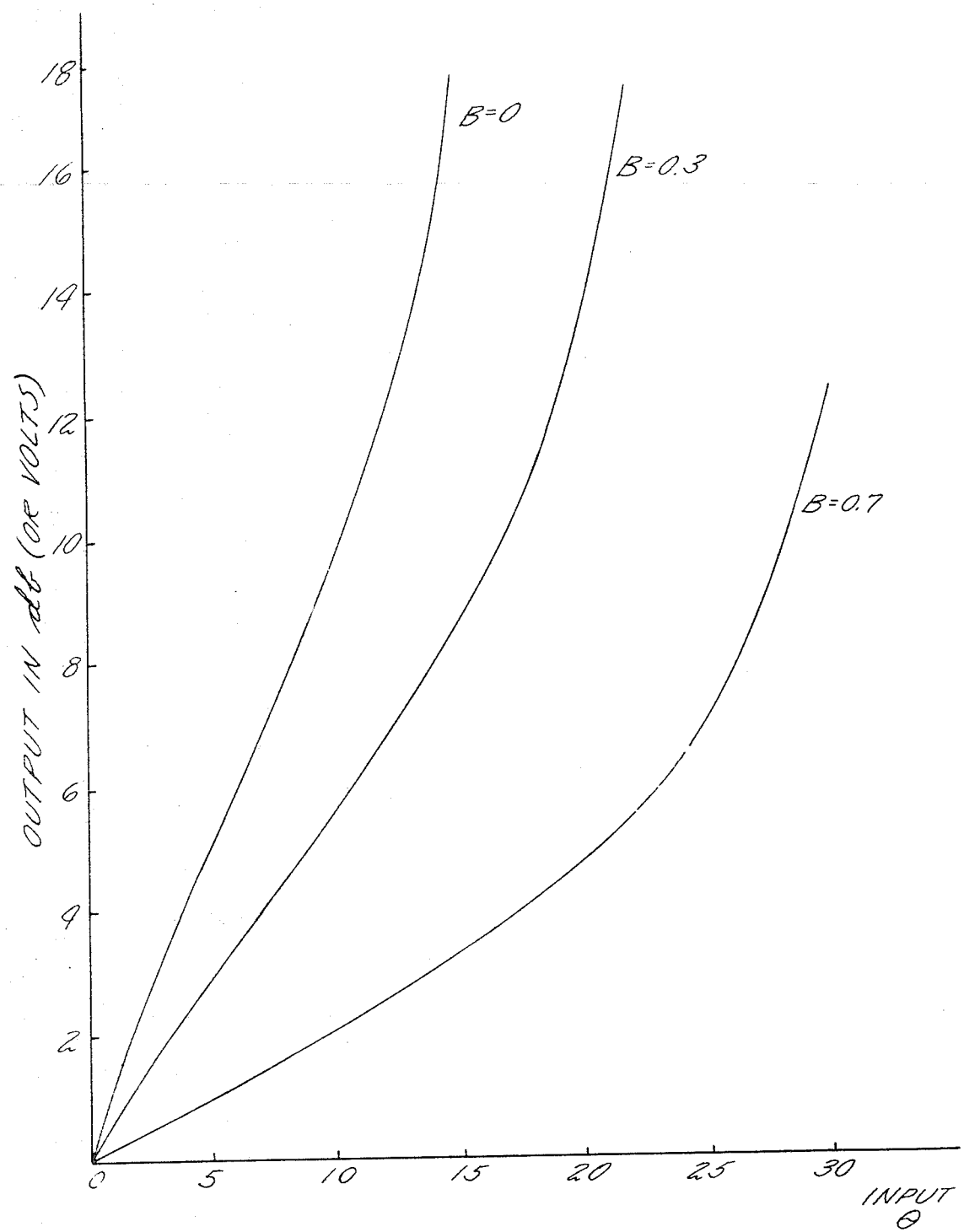

RF PHASE DETECTED INTERFEROMETER RADAR

BACKGROUND OF THE INVENTION

1. Field of Invention

This invention relates to phase interferometer radars, and more particularly to a simplified, FR phase detected interferometer.

2. Description of the Prior Art

Phase interferometer radars, sometimes referred to as phase monopulse radars, utilize a pair of receiving antennae, displaced from each other in a plane within which the angle at which a plane wave is incident upon the antennas is to be measured. The difference in the electrical phase of the signals generated within the antenna as a result of the wave is an indication of the angle of incidence. If the wave approaches the antenna from a direction which is parallel with their common boresight axis, the wave will arrive at both antennas simultaneously. However, if the wave approaches at an angle, it reaches one of the antennas before the other, causing a difference in phase in the resulting signal. Measurement of this electrical phase difference provides an indication of the angle of incidence of the wave.

In phase interferometer radars known to the prior art, the signals received at each antenna are first heterodyned to an IF frequency in mixers controlled by the same local oscillator. Then many stages of IF amplification are applied to normalize the amplitudes of the two signals, thereby to permit phase detection which is free of error due to differences in amplitude. The phase difference is measured at the output of the IF amplifiers, and the signal representative thereof is further processed to determine the wave incidence angle, $\theta$, as a function of the phase angle, $\phi$, in accordance with the following well known relationship:

1. $\theta = \arcsin \lambda\phi/2\pi d$, where $\lambda$ is the wavelength and $d$ is the antenna spacing.

However, the phase relationship must be preserved in the processing of the signals up to the point where the phase difference between the two signals is resolved. This means that the two channels of signal processing, including mixers, amplifiers, and so forth, must be completely phase balanced. This renders phase interferometer receiving processing equip-ment extremely expensive, thus limiting the usage thereof to highly sophisticated systems, such as military navigation, detection, and weapon delivery systems.

SUMMARY OF INVENTION

The object of the present invention is to provide a simplified interferometer radar system.

According to the present invention, RF signals received at each of a pair of spacially displaced radar receiving antennas applied to respective input ports of a device, such as a quadrature hybrid, which provides at respective output ports voltage which are proportional to trigonometric functions of the relative electric phase difference and the negative thereof, respectively, said voltages being multiplexed through means for heterodyning to an IF frequency, logarithmically amplified, individually sampled and held, and one subtracted from the other so as to produce a single voltage as a function of the electrical phase difference of the signals received at the antenna.

In accordance still further with the present invention, the signals received at each antenna may be combined in a cross coupling network which has a phase compression effect to extend the range of incident wave angles which can be detected unambiguously, prior to being passed to said phase detecting device.

The present invention is easily implemented utilizing components readily available in the market. The RF sections of the invention can be implemented within a composite antenna structure so as to minimize the complexity of phase-balancing of the two separate RF channels. By utilizing a single IF amplifier for both channels, the necessity of phase-balancing of separate IF amplifier channel is totally eliminated.

Other objects, features and advantages of the present invention will become more apparent in the light of the following detailed description of a preferred embodiment, as illustrated in the accompanying drawing.

BRIEF DESCRIPTION OF THE DRAWING

FIG. 1 is a simplified schematic block diagram of a preferred embodiment of the present invention;

FIGS. 2-4 are illustrations of waveforms; and

FIG. 5 is a graph illustrating gain of a system according to the invention.

DESCRIPTION OF THE PREFERRED EMBODIMENT

Figure 3:
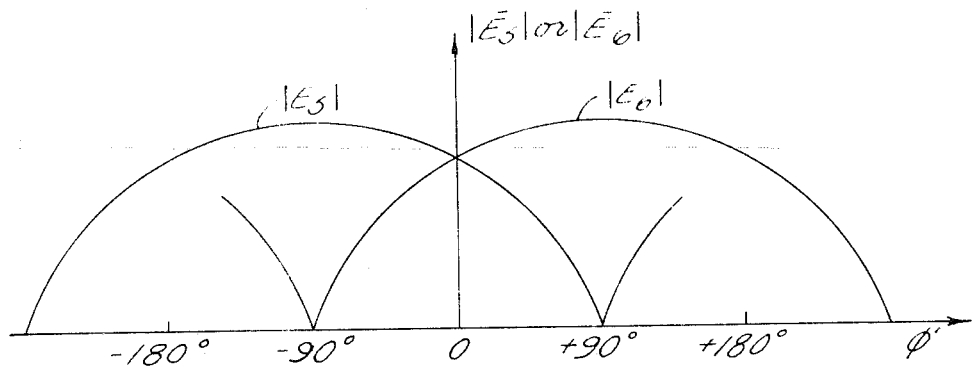

Referring to the drawing, a pair of antennas 10, 12, are separated by a distance d so that a wave, having a wavelength $\lambda$, incident at an angle $\theta$ to the antennas 10, 12 will provide a phase difference in the signal generated within the antennas. The antennas 10, 12 each feed respective ports 14, 16 of a cross coupling network (CCN) 18 which comprises a pair of couplers 20, 21 feeding opposite TEE couplers 22, 23 (sometimes referred to as magic tees). The couplers 20, 21 divide the energy from each of the antennas, applying some of it to the tee 22 and some of it to the tee 23, in each case. As is described more fully hereinafter, the utilization of the cross coupling network 18 is optional, and serves to increase the range of incident angles to which the system is sensitive without ambiguity. Outputs from the tees 22, 23 are applied to respective input ports 24, 26 of a means 28 for converting the two waves at the input ports 24, 26, the relative phase of which is a function of the incident angle $\theta$, into a pair of voltages at respective output ports 30, 32, the magnitude of which is a function of the incident wave angle $\theta$. Such a device may preferably comprise a quadrature hybrid (QH), which is a well known device readily available from numerous sources in the market place. The ports 30, 32 feed respective isolators which prevent back transmission (from right to left in the drawing) of waves within the circuitry. Such devices may comprise an element (such as a ferrite) which rotates waves in opposite directions in dependence upon the direction of propagation therethrough, together with connection to suitably oriented output transmission lines 38, 40, which may comprise waveguides, so that waves rotated in the isolators 34, 36 in the forward direction match with the transmission lines 38, 40 but waves propagating in the inverse direction do not match with the ports 30, 32 (which themselves may comprise waveguides in some embodiments). The waveguides 38, 40 are connected to respective poles 42, 44 of an RF switch 46, the output of which is coupled to a mixer 48, along with the output of a local oscillator 50 which heterodynes the RF input to the mixer 48 for application to a logarithmic IF amplifier 52. The output of the amplifier 52 is applied to a pair of sample and hold circuits 54, 56. Each of the sample and hold circuits 54, 56 is caused to sample the voltage output of the log amplifier 52 in response to a related signal on a corresponding line 57, 58 each of which is responsive to a related AND circuit 59, 60 operative under the control of signals on corresponding lines 61, 62 from related outputs of a flip flop 63. The flip flop 63 is triggered by a PRF signal on a line 64 derived from the circuitry in the radar (not shown) which defines the repetition frequency of the main transmitted pulses of the radar. The flip flop 63 may also be utilized to control the RF switch; in this embodiment, it is assumed that the switch 46 will connect through the pole 44 at the same time that the AND circuit 60 is gated by a signal on the line 62.

The output of the sample and hold circuit 56 is continuously subtracted from the output of the sample and hold circuit 54 by a summing unit 68. This provides an output voltage on a signal line 70 which is proportional to the angle of incidence, $\theta$, as is described more fully hereinafter. I desired, in the utilization of the output voltage on the line 70, gating may be provided to avoid use of the voltage during the period of time that the content of either of the sample and hold circuits 54, 56 is changing.

The AND circuits 59, 60 are gated by a range gate signal on a line 66. In the simple embodiment of FIG. 1, which is for illustrative purposes only, only two sample and hold circuits 54, 56 are shown. However, this embodiment would be useful simply for tracking single targets in response to a single range gate signal on the line 66. For multiple target angle resolution, a plurality of range channels would be provided, each range channel corresponding to a given range within the range resolution of a system employing the present invention, each range channel having two sample and hold ciuits 54, 56, two AND circuits 59, 60 and a summing unit 70, which are controlled and operated in the fashion described with respect to FIG. 1. Each range channel would have a different range gate line 66 coming from the various range outputs of a range strobe, as is well known. The different range channels are commonly referred to as range filters, since through range gating they sort out all the return signals into the discrete ranges from which reflections are received. In such a system, the present invention would provide an angle indication to each resolvable range/azimuth or range/-doppler bin, or cell. In this connection, it is important to note that the present invention is equally applicable, and the circuitry 10–52, 63 and 64 would be identical regardless of the number of resolvable range elements in the system in which the present invention is comprised.

The present invention may be practiced without utilizing a cross coupling network 18, as described hereinbefore. However, operation of the invention is described including the cross coupling network, with a simple explanation of the effect of removal thereof.

The waves, which are vector waveforms, received at the antennas 10, 12 may be expressed as follows, assuming equal amplitudes;

$$\overline{E_1} = E \sin wt$$

(2)

$$\overline{E_2} = E \sin (wt + \phi)$$

(3)

where the waveform received by the antenna 12 is arbitrarily taken to be a reference and therefore has a zero phase angle, and the difference in phase between the signals and the two antennas 10, 12 is all ascribed to the waveform at the antenna 10 with an angle of $\phi$.

As the waves $\overline{E_1}$ and $\overline{E_2}$ enter the ports 16, 14 a portion of each wave is coupled off by the couplers 20, 21 and transmitted to the tees 22, 23 for addition with the remaining portion of the original wave. The voltage which is cross coupled is determined by the coupling coefficient, B, of the couplers 20, 21. For instance if 3db couplers are utilized, the voltage taken from the coupler 21 and applied to the tee 23 will be .7 of the voltage at the input port 16. Operation of the cross coupler 18 is best understood with respect to FIG. 2. Therein it can be seen that the output voltages $\overline{E_3}$, $\overline{E_4}$ are vector sums of the respective input voltages plus some fraction (B) of the opposite input voltage. The cross coupling results in two resultant vectors ($\overline{E_3}$, $\overline{E_4}$) whose amplitudes are equal, to each other, but both vary as a function of $\phi$. For any B greater than zero, the resultant vector will have a relative phase angle which is always less than the original phase angle of the input vectors. This therefore provides phase angle compression ($\phi'$ being less than $\phi$), so that the vector waveforms may enter the quadrature hybrid 28 with a lesser relative phase angle than that which obtains at the antennas. Since the quadrature hybrid can resolve relative phase angles of vector waveforms inputting thereto unambiguously for relative angles of up to 90°, and thereafter becomes bivalued and ambiguous, the phase angle compression as illustrated in FIG. 2 means that relative angles at the antenna of greater than 90° can be compressed to 90° or less, thereby permitting unambiguous angle resolution for more than 90° of relative phase angle at the antennas.

The magnitude, E', each wave is the same as the other and can be expressed as follows:

$$E' = |\overline{E_3}| = |\overline{E_4}| = 0 \quad \sqrt{(E+BE\cos\phi)^2 + (BE\sin\phi)^2}$$

(4)

and the angle, $\phi'$, between the two vectors is expressed as:

$$\phi' = \phi - (\alpha_1+\alpha_2) = \phi - 2\alpha_1 = \phi - 2\tan^{-1} [B E\sin\phi/(E+BE\sin\phi)]$$

(5)

so $$\phi' = \phi - 2\tan^{-1} B\sin\phi/(1+B\sin\phi)$$

(6)

The vectors $\overline{E_3}$ and $\overline{E_4}$ can therefore be described using the angle of $\overline{E_3}$ as a new reference, as follows:

$$\overline{E_3} = E'\sin wt$$

(7)

$$\overline{E_4} = E'\sin (wt+\phi')$$

(8)

The quadrature hybrid couples half the power at each input port into the opposite output port with a 90° phase shift; this is achieved by coupling 0.7 of the voltage of each input port to the opposite output port, so that the output of the quadrature hybrid 28 can be expressed as follows:

$$\overline{E_6} = 0.7E'\sin(wt+\phi') + 0.7E'\sin(wt+90°) \quad (9)$$

so $$\overline{E_6} = 0.7E'[\sin(wt+\phi') + \sin(wt+90°)] \quad (10)$$

Using the trigonometric identity $$\sin A + \sin B = 2 \sin \tfrac{1}{2}(A+B) \cos \tfrac{1}{2}(A-B), \quad (11)$$

$\overline{E_6}$ can be expressed $$\overline{E_6} = 1.4E'\sin \tfrac{1}{2}(wt+\phi'+wt+90°) \cos \tfrac{1}{2}(wt+\phi'-wt-90°) \quad (12)$$

$$\overline{E_6} = 1.4E'\sin(wt+(\phi'/2)+45°) \cos[(\phi'/2) - 45°] \quad (13)$$

The sine term represents the carrier frequency at a given phase, and the cosine term represents the amplitude of the envelope. In the present case, all that is required is an expression of $\phi'$, which is the magnitude of $\overline{E_6}$; thus the function of the quadrature hybrid, in this application of it, is to convert phase information to amplitude information; only the magnitude of $\overline{E_6}$ is therefore of interest, which can be expressed as $$|\overline{E_6}| = 1.4E'\cos[(\phi'/2) - 45°] \quad (14)$$

By means of an analogous derivation, the magnitude of the other output of the quadrature hybrid 28 is $$|\overline{E_5}| = 1.4E'\cos[-(\phi'/2) - 45°] \quad (15)$$

Figure 4:
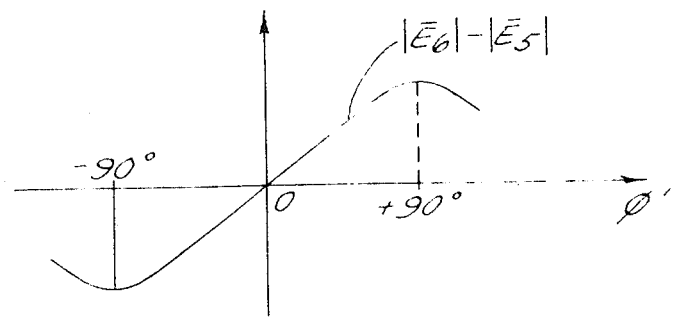

The values of $|\overline{E_5}|$ and $|\overline{E_6}|$ are plotted in FIG. 3. Subtraction of $|\overline{E_5}|$ from $|\overline{E_6}|$ yields a transfer curve as illustrated in FIG. 4. Because the magnitude E' varies as a function of the angle of incidence of the incoming wave (as described hereinbefore), subtraction of $|\overline{E_5}|$ from $|\overline{E_6}|$ as an indication of angle is accurate only for zero angles, because the scale factor or sensitivity of the transfer function of FIG. 4 varies with angle due to the variation in the E' term. For that reason, subtraction of the log of these terms is utilized since this is the same as taking the ratio of the terms so as to cancel E' therefrom. Thus, the output voltage is $$E_0 = E_8 - E_7 = \log|\overline{E_6}| - \log|\overline{E_5}| \quad (16)$$

$$E_0 = \log\left[\frac{|\overline{E_6}|}{|\overline{E_5}|}\right] = \log \frac{1.4E'\cos\left(\frac{\phi'}{2}-45°\right)}{1.4E'\cos\left(-\frac{\phi'}{2}-45°\right)} \quad (17)$$

so $$E_0 = \log \frac{\cos\left(\frac{\phi'}{2}-45°\right)}{\cos\left(-\frac{\phi'}{2}-45°\right)} \quad (18)$$

Thus, equation (18) shows that the output voltage on the line 70 is a voltage which is proportional, in a nonlinear fashion, to $\phi'$, and therefore through equation (6), is also proportional in a nonlinear fashion to $\phi$. Through equation (1), it is seen that $E_0$ is also proportional in a nonlinear fashion to $\theta$, the angle of incidence. The output voltage as a function of the angle of incidence $\theta$ is plotted in FIG. 5. In FIG. 5 it is seen that the lower the value of B the fewer degrees of incidence which can be detected; of course, wider fields of angle of incidence can be provided, but not without amgituity which results from the transfer characteristics of the quadrature hybrid, as seen in FIG. 4.

At the output of the quadrature hybrid 28, the desired information is contained in the absolute magnitudes of $\overline{E_5}$ and $\overline{E_6}$, which vary from each other, sinusoidally, due to the different sign of the angle $\phi'$ in equations (14) and (15). Therefore, it is no longer necessary, in the remaining processing (to the right of the quadrature hybrid 28 in FIG. 1) to maintain phase balance between two channels. All that remains is to maintain amplitude balance which is simply achieved in accordance with the present invention by using the same mixer 48 and amplifier 52 for the signals of both channels, by means of multiplexing.

Utilization of the output voltage on the line 70 may, if desired, include linearizing so as to have a voltage which is a linear function of the incidence angle $\theta$. Such linearizing is well known in the art, and may comprise, for instance, a function generator comprised of an operational amplifier strapped with breakpoint feedback, or a diode/resistor network having sufficient number of breakpoints to give the desired linearity. This may be considered to be the same as straightening-out the curves of FIG. 5; however, such linearizing is optional, and not a part of the present invention.

The cross coupling network 18 may be formed using nothing but magic tees if desired, in which case a first magic tee would couple a portion of the energy out of each channel, followed by a second magic tee which would couple only half of that to the other channel. Similarly, direct coupling with attenuation may be used if desired. Instead of using a quadrature hybrid 28, phase detection may be achieved by utilizing certain other devices, if desired, although the quadrature hybrid is preferred since it is readily available and performs the desired function in an adequate fashion. However, if desired, a suitable form of short slot coupler or other hase detector may be used if desired.

Thus, although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of my invention, that which I claim as new and desire to secure by Letters Patent of the United Stages is:

1. Radar signal receiving and processing apparatus providing RF phase detection of signals, adapted for use in an interferometer radar system of the type having a pair of radar wave receiving antennas spaced apart in a plane witin which the angle of incidence of a wave received at said antenna is to be detected, comprising:

- a quadrature having a pair of input ports adapted for interconnection with respective ones of the antennas of the radar system, and having a pair of output ports;
- means for intercoupling said input ports with said antennas;
- an RF switch having a pair of poles interconnected with said output ports, and having an output adapted to be switched between each of said poles;
- a local oscillator;
- a mixer responsive to the output of said RF switch and to said local oscillator for heterodyning signals from said switch to an intermediate frequency at an output thereof;
- a logarithmic amplifier connected to the output of said mixer;
- a pair of sample and hold circuits connected to the output of said logarithmic amplifier;
- means responsive to the voltage value held in said sample and hold circuits to provide a voltage which comprises the difference between the voltages held therein; and
- means adapted for connection with the transmitter of the radar system for cyclically operating said RF switch and activating said sample and hold circuits, in an alternative fashion, at the pulse repetition frequency of the radar, thereby to pass the signal from one output port of said quadrature hybrid through said mixer and said logarithmic amplifier to be sampled and held in one of said sample and hold circuits in response to one transmitted pulse, and to pass the signal from the other output of said quadrature hybrid through said mixer and said logarithmic amplifier to be sampled and held in the other of said sample and hold circuits in response to the next transmitted pulse, and thence from said first port through to tsaid first sample and hold circuit on the following transmitted pulse, and so forth.

2. Radar signal receiving and processing apparatus according to claim 1 wherein said means for interconnecting said input ports with said antennas consists of means for compressing the relative phase angle between two signals respectively provided by said antennas to the respective input ports of said quadrature hybrid.

* * * * *